(12) United States Patent
Fukuda et al.

(10) Patent No.: US 8,855,378 B2
(45) Date of Patent: Oct. 7, 2014

(54) BIOMETRIC AUTHENTICATION DEVICE AND METHOD

(75) Inventors: Mitsuaki Fukuda, Sagamihara (JP); Soichi Hama, Atsugi (JP); Takahiro Aoki, Kawasaki (JP); Yuka Jo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 13/534,214

(22) Filed: Jun. 27, 2012

(65) Prior Publication Data

US 2013/0051628 A1 Feb. 28, 2013

(30) Foreign Application Priority Data

Aug. 22, 2011 (JP) ................................ 2011-180902

(51) Int. Cl.
*G06K 9/00* (2006.01)
(52) U.S. Cl.
CPC .................................. *G06K 9/00885* (2013.01)
USPC ......................................................... 382/115
(58) Field of Classification Search
None
See application file for complete search history.

(56) References Cited

U.S. PATENT DOCUMENTS

| 6,587,581 | B1 * | 7/2003 | Tanaka et al. ................. 382/149 |
|---|---|---|---|
| 2003/0011596 | A1 * | 1/2003 | Zhang et al. ................... 345/426 |
| 2003/0152252 | A1 | 8/2003 | Kondo et al. |
| 2004/0179723 | A1 * | 9/2004 | Sano et al. ..................... 382/124 |
| 2005/0180620 | A1 | 8/2005 | Takiguchi |
| 2005/0276508 | A1 * | 12/2005 | Coleman et al. ............... 382/275 |
| 2006/0018539 | A1 * | 1/2006 | Sato et al. ...................... 382/173 |
| 2006/0114328 | A1 * | 6/2006 | Kim et al. ................. 348/207.99 |
| 2007/0065015 | A1 * | 3/2007 | Nishiyama et al. ........... 382/190 |
| 2008/0069482 | A1 * | 3/2008 | Komiya ......................... 382/307 |
| 2008/0080785 | A1 * | 4/2008 | Ford .............................. 382/275 |
| 2009/0190189 | A1 * | 7/2009 | Suga .............................. 358/474 |
| 2011/0164811 | A1 * | 7/2011 | Ishiyama ...................... 382/154 |

FOREIGN PATENT DOCUMENTS

| EP | 2339534 A1 * | 6/2011 |
|---|---|---|
| JP | 10-162146 | 6/1998 |
| JP | 2003-331270 | 11/2003 |
| JP | 2004-30564 | 1/2004 |
| JP | 2005-353014 | 12/2005 |

* cited by examiner

*Primary Examiner* — Atiba O Fitzpatrick
*Assistant Examiner* — Carol Wang
(74) *Attorney, Agent, or Firm* — Staas & Halsey LLP

(57) ABSTRACT

A biometric authentication device includes, an acquisition unit configured to repeatedly image a biological part of an authenticated person while changing a relative position with respect to the biological part so as to acquire time-series biological images; a detection unit configured to detect a pixel corresponding among the biological images from the time-series biological images; an extraction unit configured to extract a pixel of which a pixel value includes a surface reflection component from the biological part, from each of the time-series biological images, on the basis of a degree of divergence of temporal variation of a pixel value of the detected pixel in the time-series biological images from an estimation result of temporal variation; a generation unit configured to correct the pixel value of the extracted pixel on the basis of a pixel value; and an authentication unit configured to perform personal authentication of the authenticated person.

18 Claims, 18 Drawing Sheets

TRACK CORRESPONDING POINTS IN CONTINUOUS IMAGES

CONVERT EACH IMAGE SO THAT CORRESPONDING POINTS ARE PLACED ON UNIFORM POSITIONS

BIOMETRIC AUTHENTICATION DEVICE AND METHOD

CROSS-REFERENCE TO RELATED APPLICATION(S)

This application is based upon and claims the benefit of priority of the prior Japanese Patent Application No. 2011-180902, filed on Aug. 22, 2011, the entire contents of which are incorporated herein by reference.

FIELD

An embodiment discussed in this specification is related to a biometric authentication technique in which individual authentication is performed by using a personal physical feature such as a fingerprint of a hand, a vein of a palm, and a face.

BACKGROUND

Personal identification is demanded in various situations in modern society. As one of methods for accurately performing personal identification, a biometric authentication technique in which individual authentication is performed by using a feature of a biological part of a human body such as a fingerprint, a vein, and a face has been widespread in recent years. For example, biometric authentication is used for determination of propriety of entering and leaving a restricted area to which only a permitted person may enter, log-in determination to a personal computer, and determination of propriety of access to various services such as online transaction.

To perform such biometric authentication, an image of a biological part such as a fingerprint, a vein, and a face is first acquired preliminarily as biological information of a user so as to be stored in a storage medium as registered biological information of the user. Afterward, when personal identification for a use of above-described services is demanded, biological information of the user is acquired again in a similar manner to the registration time. Then, comparison and collation between the biological information (authentication biological information) acquired at this time and the above-described registered biological information which is stored in the storage medium is performed so as to determine the degree of similarity of the both information. When the degree of similarity is higher than a predetermined threshold value, an authentication result authenticating an identical person is obtained.

Here, in photographing, which is performed to acquire biological information, of a biological part with an image sensor such as a camera, there is a case where a physical feature which is used for biometric authentication is not appropriately detected from an image of a biological part in a photographed image due to surface reflection of light on the biological part.

Surface reflection is a phenomenon that light reflects on a surface of an object. When a surface of an object is planar, light regularly reflects due to surface reflection as illustrated in FIG. 1A, and thus an incident angle (an angle formed by a normal line with respect to the surface and a direction of the incident light) θi and a reflection angle (an angle formed by the normal line with respect to the surface and a direction of reflection light) θr have the same angles as each other.

However, almost all objects in nature do not have completely planar surfaces and have slightly uneven surfaces, so that reflection light generated by surface reflection is actually radiated to directions spread to some extent as illustrated in FIG. 1B. The degree of the spread of the reflection light varies depending on the degree of unevenness of an object surface. For example, a human skin has a surface having large unevenness, so that reflection light generated by surface reflection on the skin is radiated to a relatively wide range. However, in such surface reflection, the intensity of reflection light in a direction of a reflection angle θr which is approximately equal to an incident angle θi is the strongest and the intensity gradually lowers as the direction varies from the direction of the reflection angle θr.

As described above, though reflection light generated by surface reflection slightly spreads, the reflection light basically has high angle dependency. Here, reflection light on an object includes reflection light generated by diffuse reflection. Diffuse reflection is a phenomenon that incident light penetrates the inside of an object, repeats diffusion, and then, is radiated from a surface of the object, as illustrated in FIG. 2.

Reflection light generated by diffuse reflection has low angle dependency with respect to an incident angle of incident light and spreads evenly in all azimuths, so that the intensity of the reflection light is approximately even independently of directions. In a precise sense, the intensity of reflection light generated by diffuse reflection in an immoderate direction (for example, a direction in an angle almost parallel to a surface of an object) lowers. However, such direction is excluded from the consideration here.

In the biometric authentication technique, an image formed by reflection light which is generated by diffuse reflection on a biological part is mainly used. For example, in vein authentication using a vein of a palm, an image based on reflection light which is generated from a near-infrared ray which is radiated to a skin and diffuse-reflects at a vein under the skin to return is taken to acquire a vein pattern under the skin and the vein pattern is extracted from this image so as to be used for biometric authentication. FIG. 3A illustrates an example of a case where extraction of a vein pattern from an image may be appropriately performed.

On the other hand, if a component based on surface reflection on a skin surface is included in the reflection light, part of an image in a photographed image may be too bright to cover over a vein pattern under the skin or components of a corrugated surface may be superposed on the vein pattern under the skin, as examples of images indicated in FIG. 3B. From such image, it is hard to appropriately obtain the vein pattern.

Such effect caused by surface reflection of light is similarly observed in a case of acquiring biological information mainly existing on a biological surface, such as a fingerprint and a face. If a bright spot is generated on a part of an image of a photographed image due to surface reflection of light, it is difficult to appropriately obtain biological information.

Several techniques have been disclosed to remove such effect of surface reflection components. For example, Japanese Laid-open Patent Publication No. 2003-331270 discloses a technique in which polarization filters are disposed in front of illumination and a camera so as to optically remove surface reflection components. In this technique, surface reflection components are removed with a polarization filter through which only light in a specific polarization direction passes by using such a property that a polarization direction of incident light of surface reflection light does not change but a polarization direction of diffuse reflection light changes. That is, in this technique, polarization filters, which have polarization properties orthogonal to each other, are respectively disposed in front of illumination and a camera so as to remove light having polarization components same as polarization components of light with which a biological object is irradiated before the light reaches the camera, thus removing only surface reflection components.

Further, for example, Japanese Laid-open Patent Publication No. 10-162146 discloses a technique in which a plurality of images, which are obtained by photographing every time lighting patterns of a plurality of illuminations which are disposed to surround a camera are changed, are composited after removing parts of over-exposure caused by surface reflection, so as to obtain one image. The intensity of a surface reflection component largely depends on a positional relationship among illumination, a camera, and a photographing object, so that parts having strong surface reflection components are different among a plurality of images obtained by photographing every time an irradiation angle of light is changed by changing a position of illumination. Therefore, in this technique, the images after removing parts of over-exposure caused by surface reflection are composited so as to obtain one image having no surface reflection.

As other related art technique, Japanese Laid-open Patent Publication No. 2004-030564 discloses a technique in which authentication processing is executed to each of a plurality of images which have different projected positions of external light, so as to obtain a final authentication result based on a plurality of authentication results which are obtained by the authentication processing.

SUMMARY

In accordance with an aspect of the embodiments, a biometric authentication device includes an acquisition unit configured to repeatedly image a biological part of an authenticated person while changing a relative position with respect to the biological part so as to acquire time-series biological images; a detection unit configured to detect a pixel corresponding among the biological images from the time-series biological images; an extraction unit configured to extract a pixel of which a pixel value includes a surface reflection component from the biological part, from each of the time-series biological images, on the basis of a degree of divergence of temporal variation of a pixel value of the detected pixel in the time-series biological images from an estimation result of temporal variation of a pixel value in all pixels that constitute the time-series biological images; a generation unit configured to correct the pixel value of the extracted pixel on the basis of a pixel value of a pixel corresponding to the extracted pixel in each of the time-series biological images other than an extraction origin of the extracted pixel, so as to generate a biological image including no surface reflection from the biological part; and an authentication unit configured to perform personal authentication of the authenticated person by using the biological image that is generated.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENT

Figure 1A:
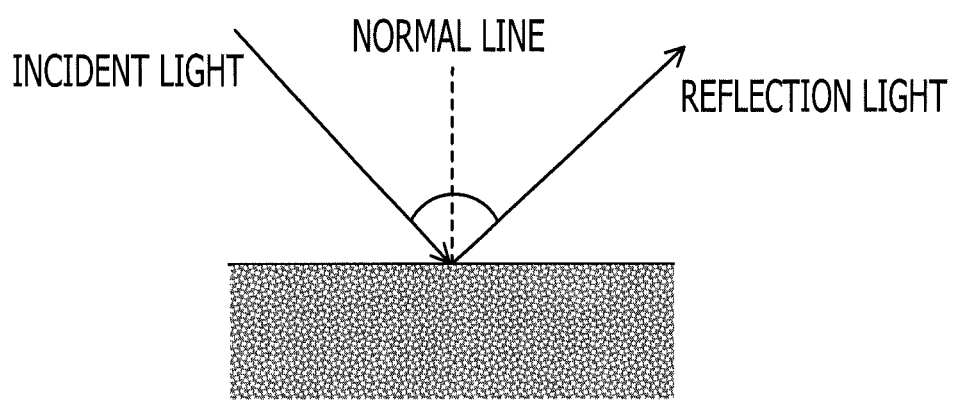
FIG. 1A is a diagram (I) illustrating surface reflection of light.
Figure 1B:
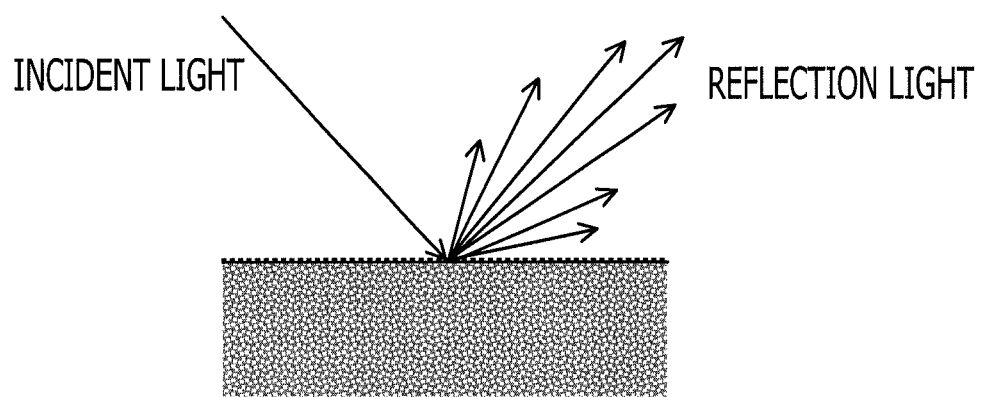
FIG. 1B is a diagram (II) illustrating surface reflection of light.
Figure 2:
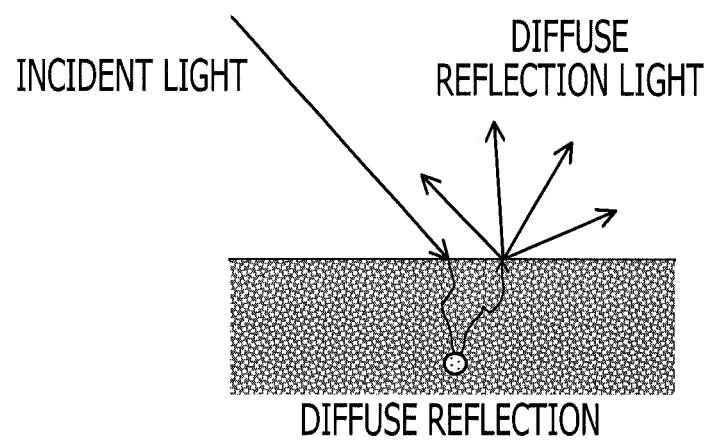
FIG. 2 illustrates diffuse reflection of light.
Figure 3A:
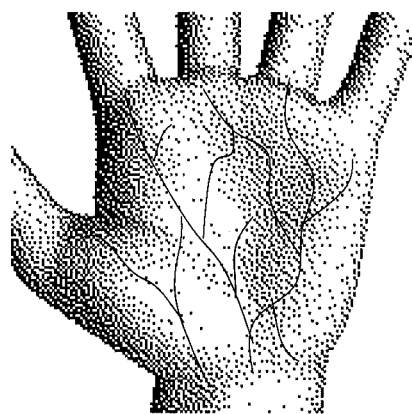
FIG. 3A is a diagram (I) illustrating an effect of surface reflection of light with respect to acquisition of biological information.
Figure 3B:
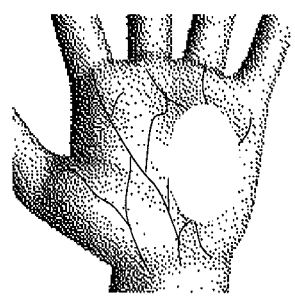
FIG. 3B is a diagram (II) illustrating an effect of surface reflection of light with respect to acquisition of biological information.
Figure 3B:
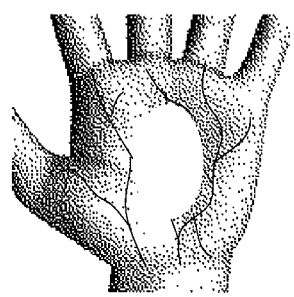
Figure 3B:
Figure 4:
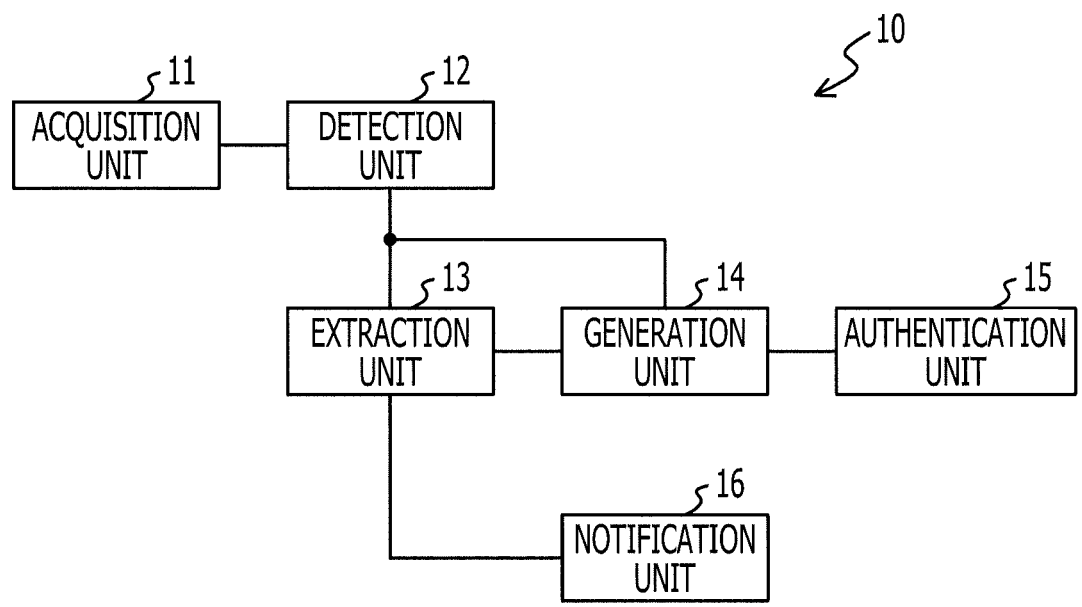
FIG. 4 is a functional block diagram of a biometric authentication device according to an embodiment.

FIG. 4 is first described. FIG. 4 is a functional block diagram of a biometric authentication device according to an embodiment. This biometric authentication device 10 includes an acquisition unit 11, a detection unit 12, an extraction unit 13, a generation unit 14, an authentication unit 15, and a notification unit 16.

The acquisition unit 11 photographs a biological part of an authenticated person while changing a relative position with respect to the biological part so as to acquire time-series biological images. The detection unit 12 detects pixels corresponding among the biological images from the time-series biological images which are acquired by the acquisition unit 11.

The extraction unit 13 extracts a pixel of which a pixel value includes a surface reflection component from the biological part, from each of the time-series biological images which are acquired by the acquisition unit 11. This pixel extraction is performed on the basis of a degree of divergence of temporal variation of a pixel value of the pixel, which is detected by the detection unit 12, in time-series biological images from an estimation result of temporal variation of pixel values of all images constituting the time-series biological images.

The generation unit 14 generates a biological image including no surface reflection from the biological part. This biological image is generated by correcting a pixel value of the extracted pixel which is extracted by the extraction unit 13 on the basis of a pixel value of a pixel corresponding to the extracted pixel, in each of the time-series biological images other than an extraction origin of the extracted pixel.

The authentication unit 15 performs personal authentication of an authenticated person by using the biological image generated by the generation unit 14. The biometric authentication device 10 includes ten or more functional blocks. The notification unit 16 will be described later.

Figure 5:
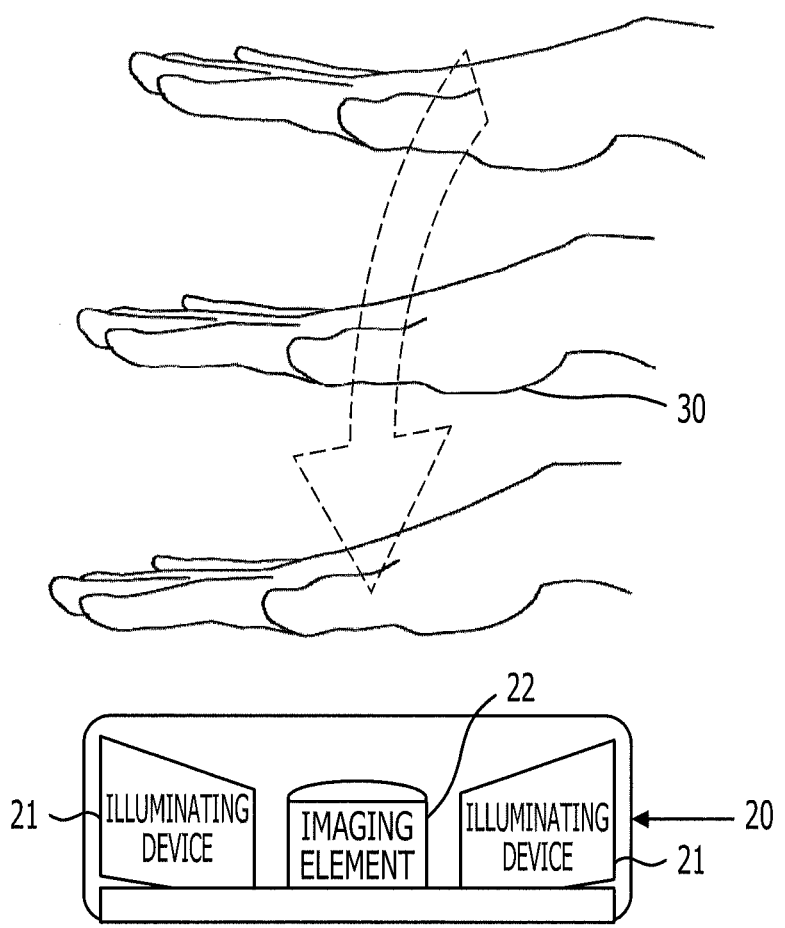
FIG. 5 illustrates the configuration of an imaging device.

An operation of the biometric authentication device 10 is now further described. A specific example of the acquisition unit 11 is first described in reference to FIG. 5. FIG. 5 illustrates the configuration of an imaging device which is used when biometric authentication is performed by using a vein of a palm.

An imaging device 20 repeatedly photographs a palm 30 while changing a relative position with respect to the palm 30, which is a biological part of an authenticated person, to acquire time-series biological images of the palm 30, and is an example of the acquisition unit 11 of FIG. 4. An image of a vein of the palm 30 is reflected in the biological images.

The imaging device 20 includes an illuminating device 21 and an imaging element 22. The illuminating device 21 irradiates the palm 30 with light for enough brightness for imaging by the imaging device 20.

The imaging element 22 receives reflection light from the palm 30 and converts the reflection light to an electric signal indicating an image of the palm 30 so as to output the electric signal. When an image of the palm 30 is picked up by this imaging device 20, an authenticated person moves and monotonically brings the palm 30 closer to the imaging device 20 while holding the palm 30 over the imaging device 20. The imaging device 20 repeatedly images the palm 30 in a period in which a relative position with respect to the palm 30 changes, so as to obtain biological images. However, there is a case where biological images obtained as described above include reflection light from the palm 30 due to the above-described surface reflection.

A method of remove, which is performed by the biometric authentication device 10, of a surface reflection component from a biological image which is obtained by the imaging device 20 is now described. In terms of an image region which is formed only by reflection light of diffuse reflection components without surface reflection components in a biological image, the brightness of the image region is mainly determined by brightness of an illumination and a relative position of a biological part with respect to the imaging device. Accordingly, if the brightness of the illumination and the relative position are same, the brightness of the image regions is approximately same even in different positions on the biological part. On the other hand, in terms of an image region which is formed by reflection light including surface reflection components, even if the above-described brightness of an illumination and relative position are same, the brightness of the image region is prominently different in different positions on a biological part. The property of surface reflection components is described.

Figure 6A:
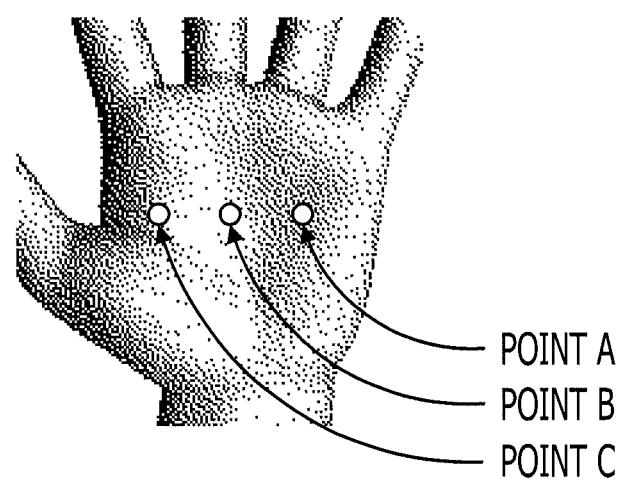
FIG. 6A illustrates a setting example of focusing points on an image of a palm.
Figure 6B:
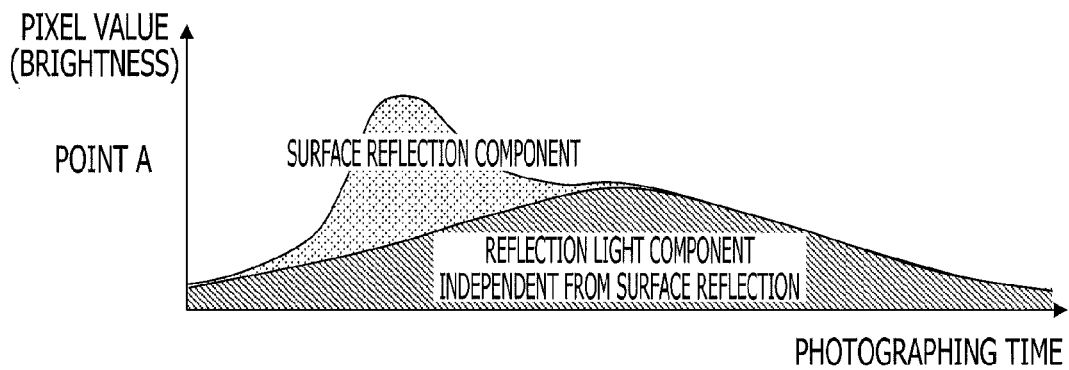
FIG. 6B illustrates graphs representing an example of pixel values of respective focusing points in time-series images.
Figure 6B:
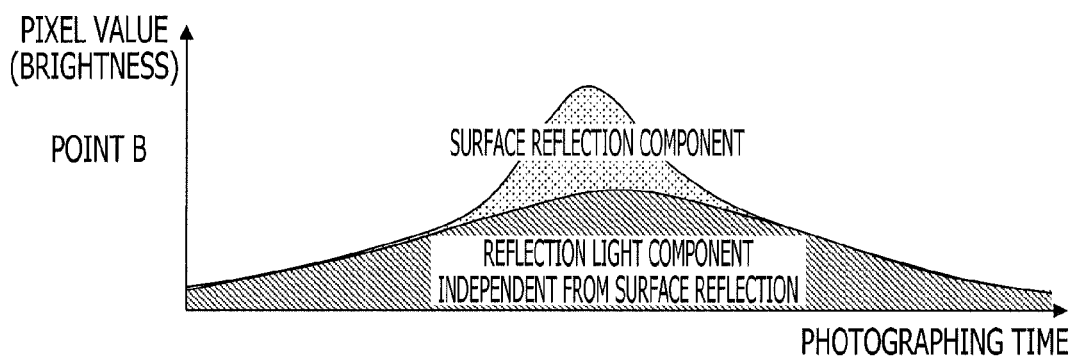
Figure 6B:
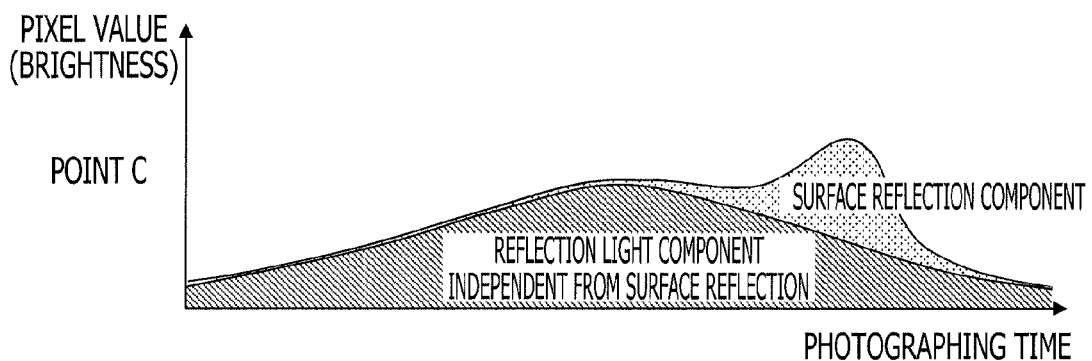

FIGS. 6A and 6B are first described. FIG. 6A illustrates an example of focused pixels (focusing points) in a biological part which is reflected in a biological image. In this example, three focusing points in total which are point A, point B, and point C are set on illustrated positions on an image of a palm 30 which is acquired by the imaging device 20 of FIG. 5.

The detection unit 12 of FIG. 4 detects these focusing points from each of the time-series images of the palm 30 which are acquired by the imaging device 20 which is an example of the acquisition unit 11. Graphs illustrated in FIG. 6B represent pixel values, which are detected by the detection unit 12 from respective time-series images of the palm 30 which are acquired by the imaging device 20, of respective focusing points.

In the graphs, a vertical axis represents a pixel value (brightness) and a horizontal axis represents photographing time of an image of the palm 30. Here, same positions in the horizontal axis direction in these three graphs indicate that photographing time is same, that is, indicate that the relative position of the palm 30 with respect to the imaging device is same.

A pixel value on the vertical axis of each of the graphs of FIG. 6B corresponds to intensity of reflection light from a focusing point. In each of the graphs, a part in which reflection light includes surface reflection components and a part in which reflection light includes only components independent from surface reflection (mainly, diffuse reflection components) are expressed by different types of hatching.

Apparent from comparison of the three graphs of FIG. 6B, photographing time at which a bump is generated in the graphs due to the inclusion of surface reflection components in reflection light is different among three focusing points. The main reason why photographing time at which surface reflection components are included is different among the focusing points is that directions of the illuminating device 21 and the imaging element 22 are different among respective focusing points of the palm 30. On the other hand, diffuse reflection components are not affected by directions, and diffuse reflection on a skin of the same person has an approximately same property irrespective of a part of the skin, so that change of diffuse reflection components is approximately uniform even if positions of focusing points are different from each other. Accordingly, if images which are obtained by continuously photographing a biological part are analyzed and a component exhibiting uniform brightness variation in the whole of the biological part irrespective of positions is extracted, the brightness variation may be considered as variation of diffuse reflection components.

By the way, pixel values of the three focusing points in total which are the point A, the point B, and the point C are different according to biological features of respective focusing points (for example, existence of a vein under the skin and the like) even in photographing time at which only components independent from surface reflection components are included in reflection light. On the other hand, temporal variation rates of pixel values of these focusing points are approximately same as each other.

Figure 7:
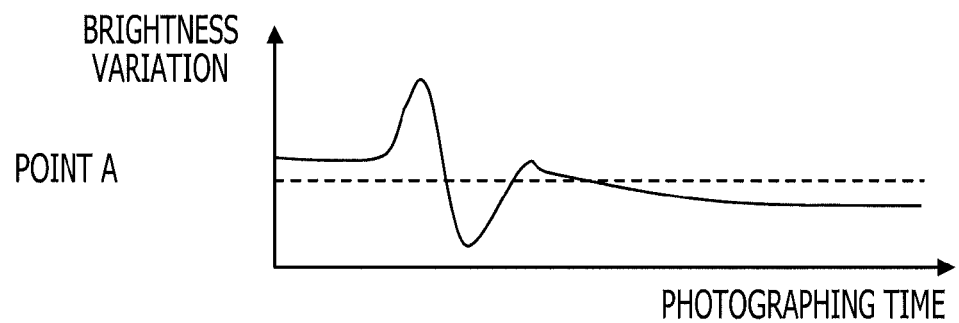
FIG. 7 illustrates graphs representing an example of pixel value temporal variation rates of the focusing points.
Figure 7:
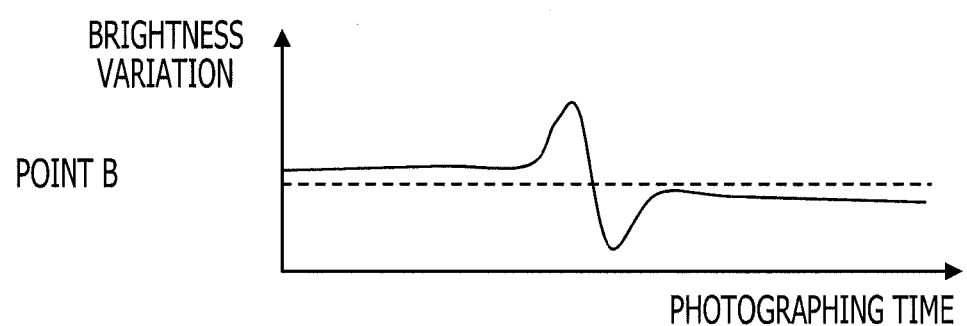
Figure 7:
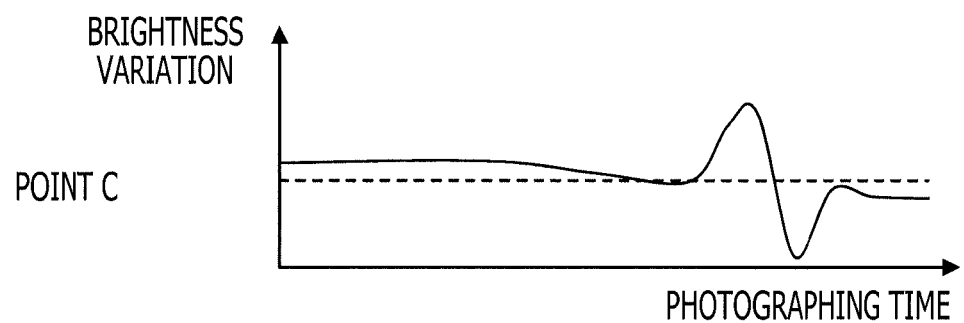

Here, FIG. 7 is described. FIG. 7 illustrates an example of pixel value temporal variation rates of respective focusing points in time-series images of the palm 30 which are acquired by the imaging device 20 by graphs, and the graphs of FIG. 7 are obtained by time-differentiating functions of the three graphs of FIG. 6B.

Referring to the three graphs of FIG. 7, all of the graphs have approximately-same curves of brightness variation (pixel value temporal variation rate) in a photographing time period in which only components independent from surface reflection are included in reflection light. On the other hand, the graphs of brightness variation of focusing points in a photographing time period in which surface reflection components are included in reflection light have shapes prominently different from graphs (only components independent from surface reflection is included in reflection light) of brightness variation of other focusing points in the same photographing time period.

Here, representative values of pixel value temporal variation rates of respective focusing points illustrated by these three graphs are calculated for every photographing time so as to estimate a pixel value temporal variation rate of the whole image of the palm 30. The method of this estimation is described with reference to FIG. 8.

Figure 8:
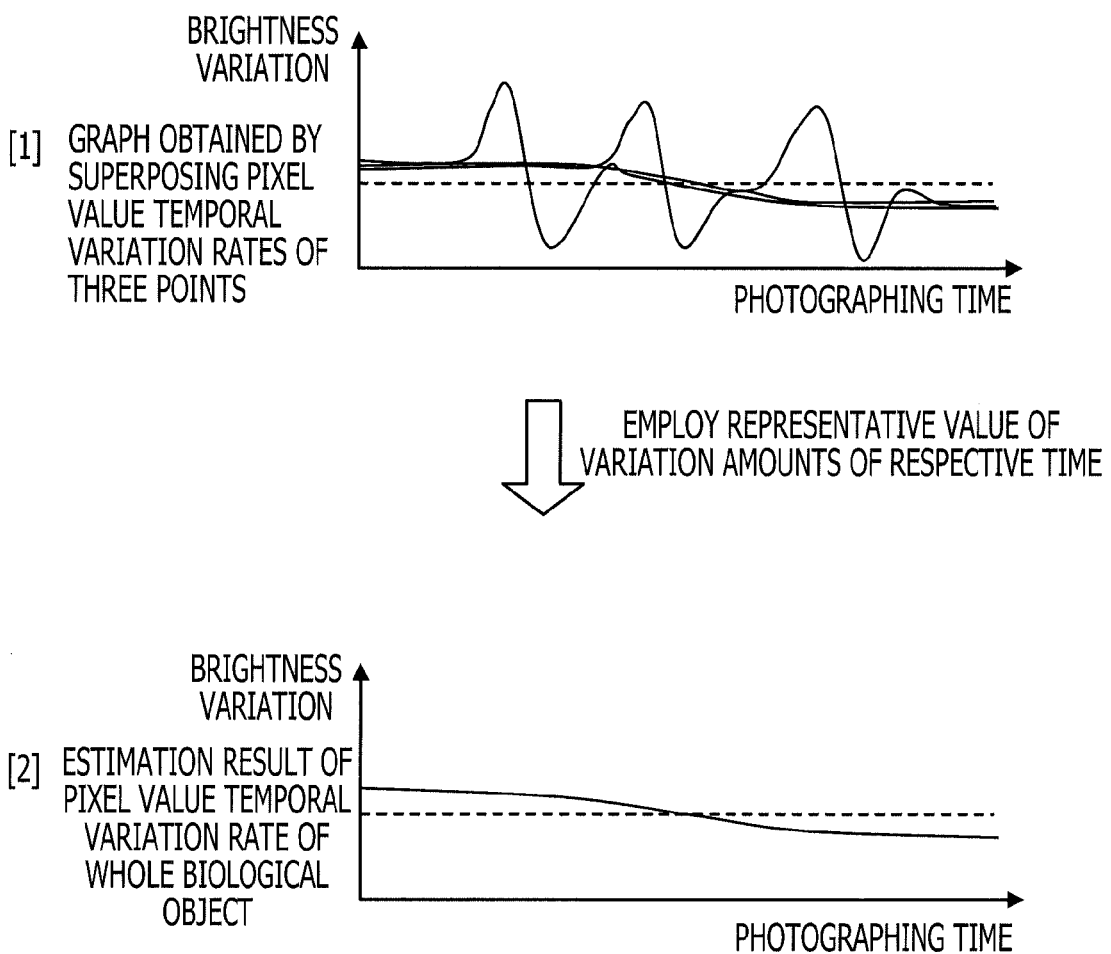
FIG. 8 illustrates estimation of a pixel value temporal variation rate of the whole image of the palm.

In FIG. 8, a graph [1] is obtained by superposing the graphs of FIG. 7 illustrating pixel value temporal variation rates of respective focusing points. Accordingly, three values (pixel value temporal variation rates) are illustrated in every photographing time of the graph.

In this embodiment, a representative value of a pixel value temporal variation rate of each focusing point for every photographing time is calculated so as to estimate a pixel value temporal variation rate of the whole image of the palm 30. In this embodiment, a median value (median) of pixel value temporal variation rates of respective focusing points is calculated as the representative value. The graph [2] in FIG. 8 illustrates median values of pixel value temporal variation rates of respective focusing points for every photographing time, that is, illustrates an estimation result of a pixel value temporal variation rate of the whole image of the palm 30. This estimation result may be considered as illustration of a temporal variation rate of a pixel value which is obtained only from reflection light components independent from surface reflection (diffuse reflection components).

Here, a representative value of a pixel value temporal variation rate which is calculated in estimation of a pixel value temporal variation rate of the whole image of the palm 30 is not limited to a median value but may be an average value, for example. The estimation of a pixel value temporal variation rate of the whole image of the palm 30 is performed as described above.

Then, the estimation result, which is obtained as described above, of a pixel value temporal variation rate of the whole image of the palm 30 is compared to a pixel value temporal variation rate on a focusing point, being able to specify a period of photographing time in which surface reflection components are included in reflection light on the focusing point. This specifying method is described with reference to FIG. 9.

Figure 9:
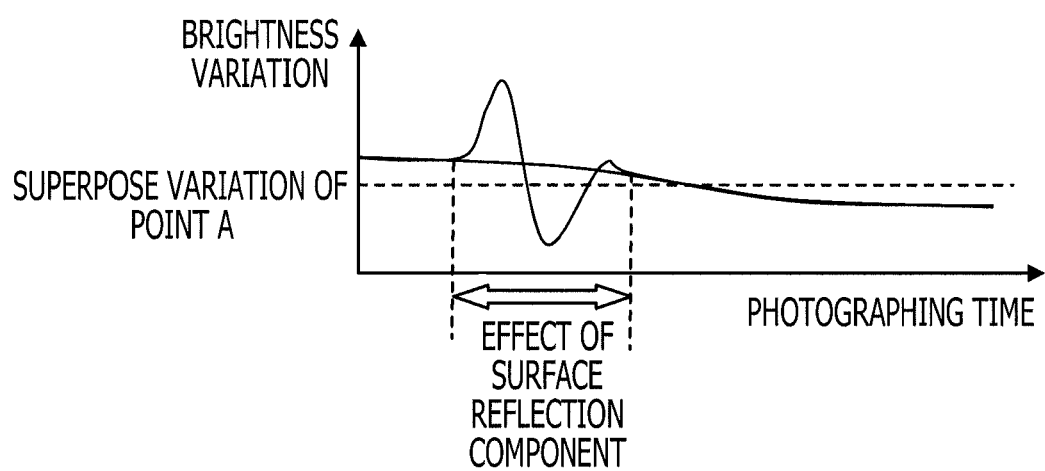
FIG. 9 illustrates a method for specifying a period of photographing time in which reflection light on the focusing point includes surface reflection components.

A graph of FIG. 9 is obtained by superposing the graph of the pixel value temporal variation rate of focusing point A in FIG. 7 on the graph [1] in FIG. 8, that is, the graph of an estimation result of the pixel value temporal variation rate of the whole image of the palm 30. Such superposition of the two graphs clearly exhibits a period of photographing time in which there is divergence of the pixel value temporal variation rate of the focusing point A from the estimation result of the pixel value temporal variation rate of the whole image of the palm 30. This period is a period of photographing time in which a pixel value is affected by surface reflection components at the focusing point A.

The extraction unit 13 of FIG. 4 extracts focusing points in a period of photographing time which is specified as described above and in which the pixel value is affected by surface reflection components, from each of time-series images of the palm 30 which are acquired by the imaging device 20 which is an example of the acquisition unit 11. Then, the generation unit 14 of FIG. 4 corrects the pixel value of the focusing point, which is extracted by the extraction unit 13 as described above, so as to generate an image of the palm 30 including no surface reflection components. The correction is performed by interpolating a pixel value of a focusing point of an image of the palm 30 of an extraction origin of the extracted focusing point at photographing time on the basis of a corresponding relationship between photographing time and a pixel value of the focusing point, in each of time-series biological images except for an extraction origin of an extracted focusing point.

Figure 10:
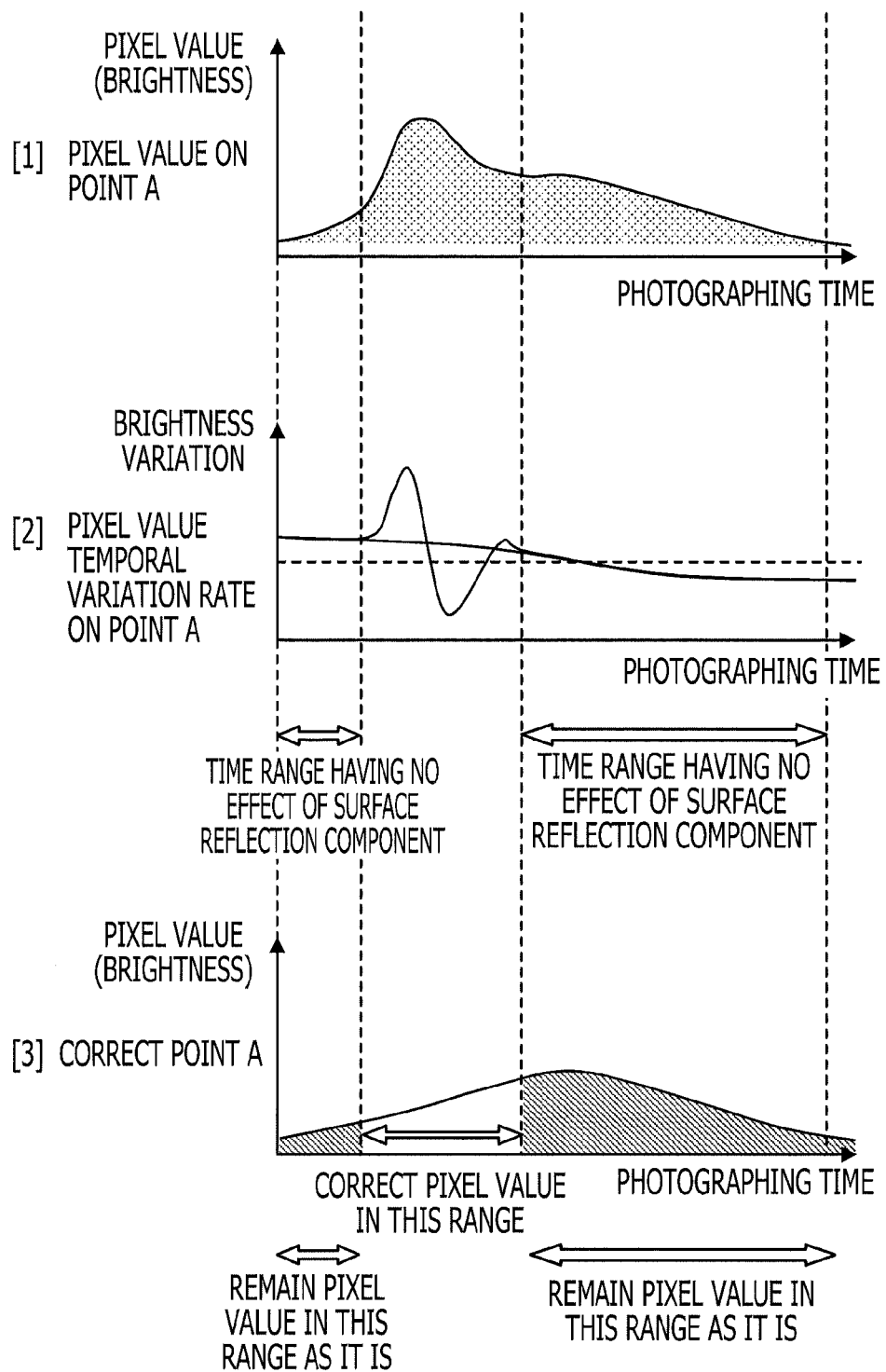
FIG. 10 illustrates a method for correcting pixel values of the focusing points on which reflection light includes surface reflection components.

The correction of a pixel value of a focusing point is now described with reference to FIG. 10. In FIG. 10, a graph [1] is a graph of the focusing point A among the graphs representing pixel values of respective focusing points and illustrated in FIG. 6B, and a graph [2] is same as the graph of FIG. 9. Further, a graph [3] is a graph representing a pixel value after correction of the pixel value of the graph [1] is performed.

First, the graph [1] of the focusing point A is separated into a period of photographing time in which a pixel value is affected by surface reflection components and a period of photographing time in which the pixel value is not affected by surface reflection components, on the basis of a degree of divergence between superposed graphs of the graph [2].

In the graph [2], it is set that the pixel value of the graph [1] is not affected by surface reflection components in a period of photographing time in which divergence of a pixel value temporal variation rate of the focusing point A from an estimation result of a pixel value temporal variation rate of the whole image of the palm 30 is small (less than a predetermined threshold value). Accordingly, a pixel value is not corrected in this period which is hatched in the graph [3].

On the other hand, in the graph [2], it is set that the pixel value of the graph [1] is affected by surface reflection components in a period of photographing time in which divergence of the pixel value temporal variation rate of the focusing point A from the estimation result of the pixel value temporal variation rate of the whole image of the palm 30 is large (equal to or above the predetermined threshold value). Accordingly, a pixel value is corrected in this period which is not hatched in the graph [3].

In the correction of the pixel value in this period, a pixel value of a focusing point in an image, which is photographed during this period, of the palm 30 corresponding to photographing time is linearly interpolated on the basis of a relationship between photographing time and a pixel value of the focusing point in images of the palm 30 which are taken immediately before and after the period, in this embodiment. This linear interpolation of a pixel value of a focusing point is performed by calculating the following formula, for example.

$$X_{new}(t_a) = \frac{(t_e - t_a)\left\{X(t_b) + \sum_{t=t_b}^{t_a} M(t)\right\} + (t_a - t_b)\left\{X(t_e) - \sum_{t=t_a}^{t_e} M(t)\right\}}{t_e - t_b}$$

Here, in the above formula, $X_{new}(t_a)$ denotes a luminance value after interpolation, at time $t_a$. Further, $X(t)$ denotes a luminance value at time t, and $M(t)$ denotes an estimation result of a pixel value temporal variation rate of the whole image of the palm 30 at time t. Time $t_b$ and time $t_e$ are respectively photographing time immediately before and after correction of a pixel value.

Correction of a pixel value does not have to be performed with respect to all images which are taken during a photographing period in which a pixel value is affected by surface reflection components. That is, the above-described correction may be performed only to an image which is taken at an optimum distance for biometric authentication, or an image to be corrected, such as an image which is thinned at a predetermined time interval, may be selected in view of time and accuracy for an execution of biometric authentication.

The generation unit 14 generates an image of the palm 30 from which surface reflection components are removed as described above. The authentication unit 15 performs personal identification of an authenticated person by using an image of the palm 30 which is generated as described above, being able to perform highly-accurate authentication.

As described above, when the biometric authentication device 10 of FIG. 4 photographs a moving biological part, the biometric authentication device 10 corrects a surface reflection component included in each point by using a property that a rate of a surface reflection component on each point of the biological part continuously varies, thus generating a biological image including no surface reflection component. Then, the biometric authentication device 10 performs personal identification of an authenticated person by using the biological image which is generated as described above.

Accordingly, it becomes possible to perform appropriate property extraction in a part in which appropriate property extraction has not been performed due to an effect of surface reflection components, improving biometric authentication accuracy. Further, a biological image including no surface reflection components is generated as described above, so that highly-accurate biometric authentication may be inexpensively performed without using a special component such as a polarization filter.

The biometric authentication device 10 of FIG. 4 further includes the notification unit 16. The notification unit 16 notifies an authenticated person of an execution of re-imaging of a biological image. The notification is performed when the degree of divergence of temporal variation of a pixel value of a pixel, which is detected by the detection unit 12, in time-series biological images from an estimation result of temporal variation of a pixel value in all pixels constituting the time-series biological images is smaller than a predetermined threshold value in all pixels.

When the above-described degree of divergence is small, it may be difficult for the extraction unit 13 to extract a pixel of which a pixel value includes a surface reflection component. In such case as well, the notification unit 16 performs the above-described notification to request an authenticated person for an execution of re-imaging, enabling re-imaging of a biological image and generation of a biological image including no surface reflection components.

Figure 11:
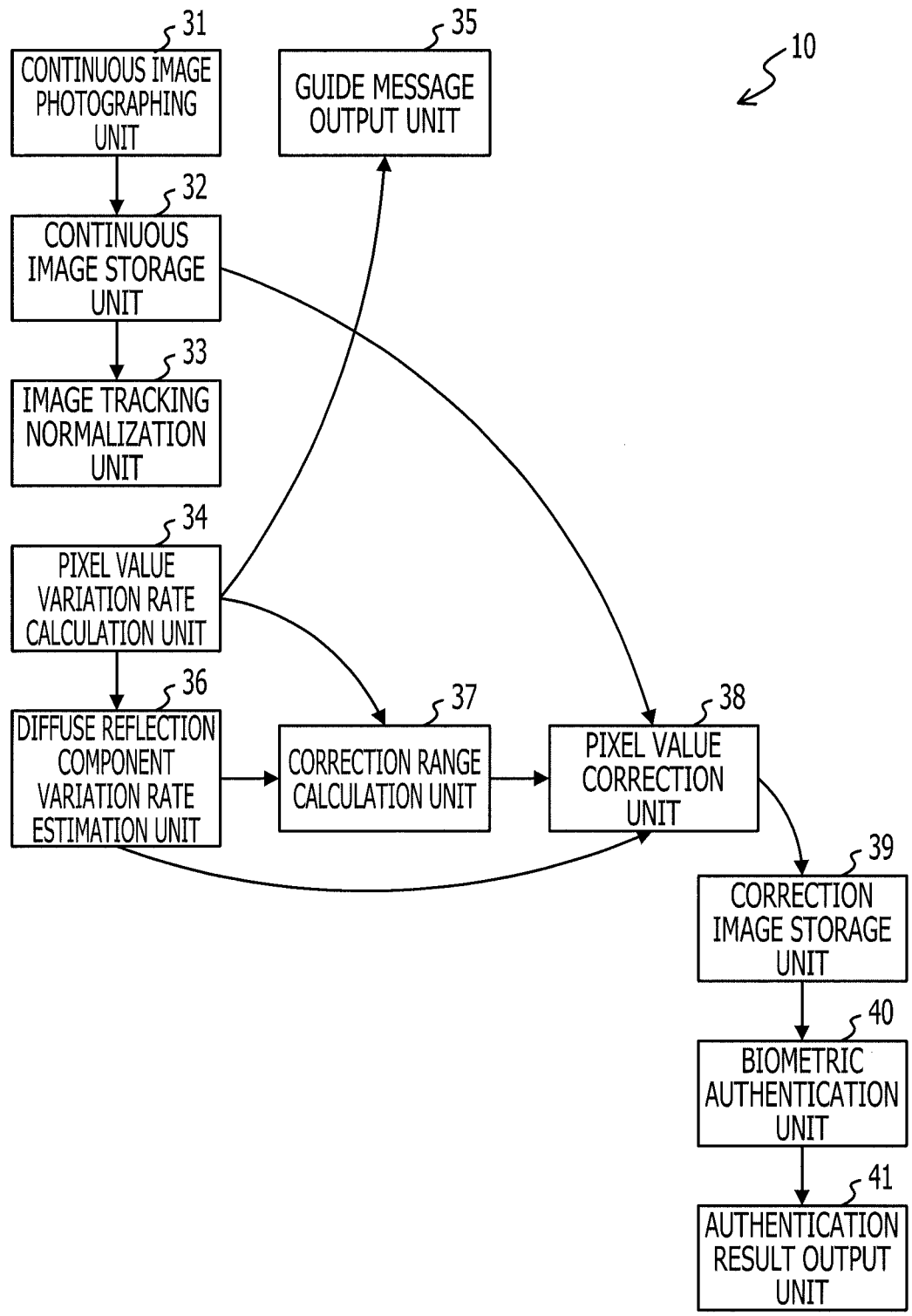
FIG. 11 is a detailed configuration block diagram of the biometric authentication device according to the embodiment.

FIG. 11 is now described. FIG. 11 is a detailed functional block diagram of the biometric authentication device 10 of the embodiment. In FIG. 11, a continuous image photographing unit 31 and a continuous image storage unit 32 are included in the acquisition unit 11 of FIG. 4. Further, an image tracking normalization unit 33 is included in the detection unit 12 of FIG. 4. Further, a pixel value variation rate calculation unit 34 and a diffuse reflection component variation rate estimation unit 36 are included in the extraction unit 13 of FIG. 4. Further, a guide message output unit 35 is included in the notification unit 16 of FIG. 4. Further, a correction range calculation unit 37, a pixel value correction unit 38, and a correction image storage unit 39 are included in the generation unit 14 of FIG. 4. Further, a biometric authentication unit 40 and an authentication result output unit 41 are included in the authentication unit 15 of FIG. 4.

The continuous image photographing unit 31 continuously photographs a moving biological part of an authenticated person so as to acquire time-series biological images. The imaging device 20 of FIG. 5, for example, serves as the continuous image photographing unit 31. The continuous image storage unit 32 is an image memory which stores the time-series biological images which are obtained by the photographing of the continuous image photographing unit 31.

Figure 12:
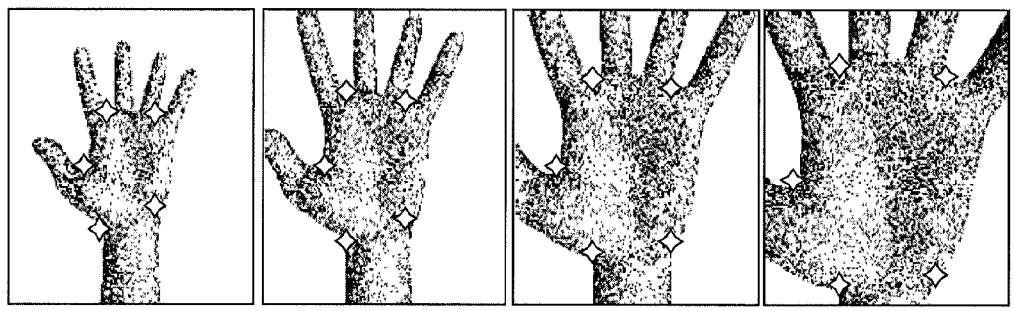
FIG. 12 illustrates normalization of biological images.
Figure 12:
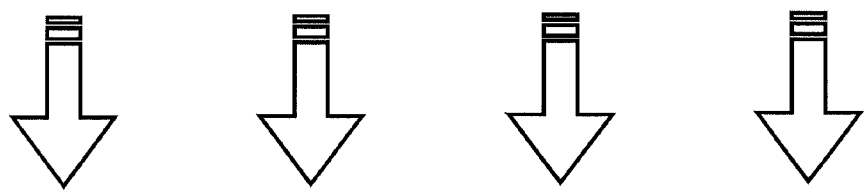
Figure 12:
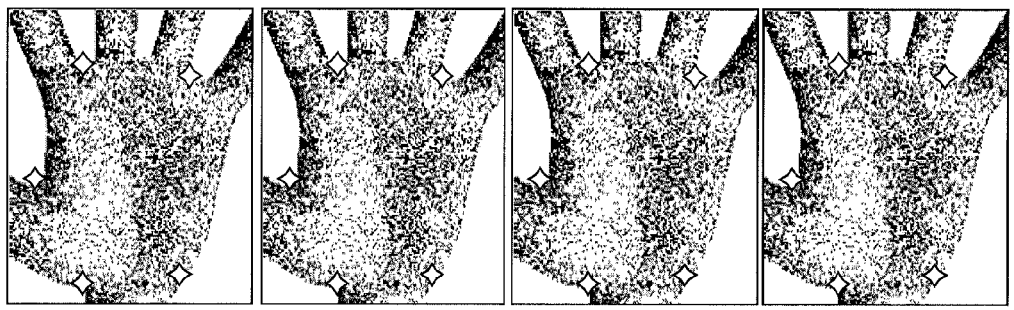

The image tracking normalization unit 33 detects a plurality of pixels (above-described focusing points), which correspond among the biological images, of an image of a biological part from the time-series biological images stored in the continuous image storage unit 32 and tracks the pixels. Further, the image tracking normalization unit 33 performs image conversion (normalization) illustrated in FIG. 12. This normalization is image conversion in which biological images are expanded and moved so as to place respective corresponding focusing points on the same positions among the biological images. Here, the image tracking normalization unit 33 may calculate positional information, on respective biological images, of corresponding focusing points instead of actually performing image conversion, so as to express a corresponding relationship of the focusing points by using the positional information.

The pixel value variation rate calculation unit 34 calculates a temporal variation rate of a pixel value of each of the focusing points of the time-series biological images which are normalized by the image tracking normalization unit 33. The guide message output unit 35 outputs a message (notification) to an authenticated person to guide the authenticated person to move a biological part for re-imaging of a biological image when the temporal variation rate of the pixel value which is obtained by the pixel value variation rate calculation unit 34 is small enough not to reach a predetermined threshold value.

The diffuse reflection component variation rate estimation unit 36 estimates a temporal variation rate of a pixel value of the whole image of the biological part, on the basis of the temporal variation rate of the pixel value which is calculated for each of the focusing points in the pixel value variation rate calculation unit 34. As described above, this estimation result may be considered that the estimation result expresses a temporal variation rate of a pixel value mainly including diffuse reflection components from a biological part.

The correction range calculation unit 37 compares the temporal variation rate, which is estimated in the diffuse reflection component variation rate estimation unit 36, of the pixel value of the whole image of the biological part with a pixel value variation rate of a focusing point of each of the biological images so as to calculate a range of photographing time in which the difference between the temporal variation rate and the pixel value variation rate is not within a range of a predetermined threshold value. This range of photographing time which is calculated by the correction range calculation unit 37 is set as a range of photographing time in which correction of a pixel value is performed on the focusing point.

The pixel value correction unit 38 corrects a pixel value within the range, which is obtained in the correction range calculation unit 37, of photographing time in which correction of a pixel value is performed to a pixel value including no surface reflection components from a biological part, for each of the focusing points.

The correction image storage unit 39 stores a biological image which is generated by correcting a pixel value of each focusing point by the pixel value correction unit 38 and includes no surface reflection from a biological part. Here, the correction image storage unit 39 stores information of the number of corrected focusing points, the variation amount of a pixel value which is changed by the correction, and the like in a manner to associate the information with the generated biological image.

The biometric authentication unit 40 performs personal identification of an authenticated person on the basis of biometric authentication in which a corrected biological image which is read from the correction image storage unit 39 is compared and collated with preliminarily-registered biological information of the authenticated person.

Here, the biometric authentication unit 40 may use a plurality of corrected biological images which are stored in the correction image storage unit 39 for biometric authentication with no priority level. Further, the biometric authentication unit 40 may grant using priority in biometric authentication of corrected biological images, on the basis of the information such as the number of corrected focusing points and the variation amount of a pixel value changed by the correction, which are stored in the correction image storage unit 39.

The authentication result output unit 41 outputs a result of personal identification performed by the biometric authentication unit 40. The biometric authentication device 10 of FIG. 11 is configured as described above. Here, part of constituent elements of the biometric authentication device 10 illustrated in FIGS. 4 and 11 may be composed of a computer having the standard configuration.

Figure 13:
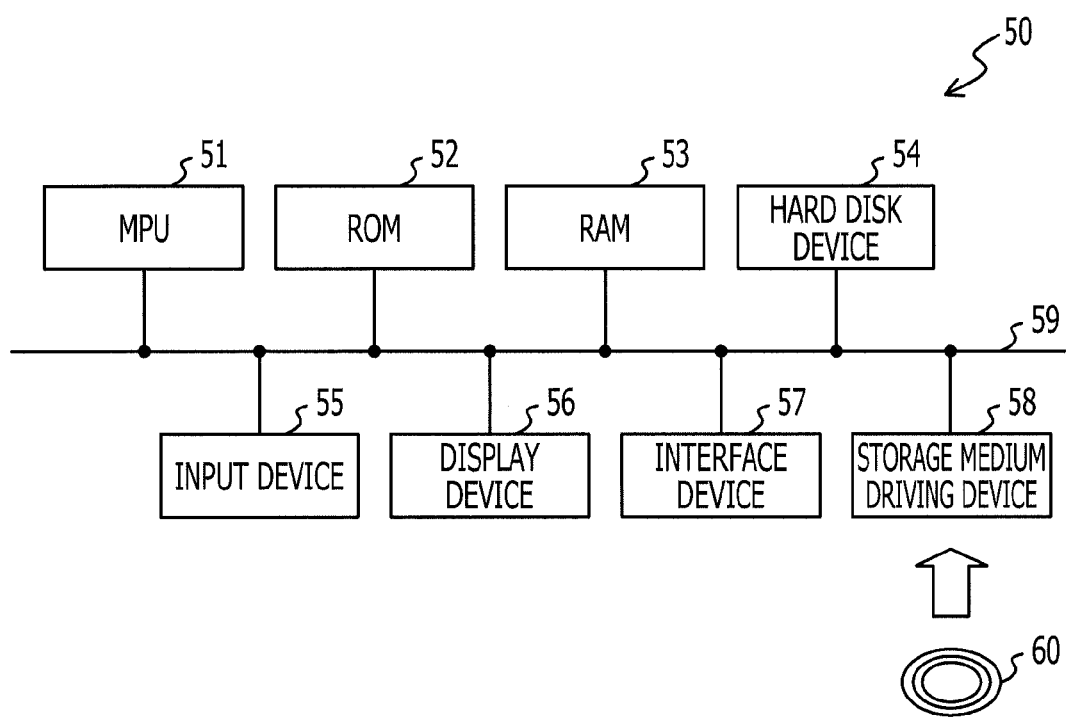
FIG. 13 illustrates a configuration example of a computer.

FIG. 13 is now described. FIG. 13 illustrates an example of the configuration of a computer. This computer 50 includes a micro processing unit (MPU) 51, a read only memory (ROM) 52, a random access memory (RAM) 53, a hard disk device 54, an input device 55, a display device 56, an interface device 57, and a storage medium driving device 58. These constituent elements are connected via a bus line 59 and may mutually transmit and receive various types of data under the control of MPU 51.

The MPU 51 is an arithmetic processing device which controls the whole operation of the computer 50. The ROM 52 is a read only semiconductor memory in which a predetermined basic control program is preliminarily stored. The MPU 51 reads and executes the basic control program at activation of the computer 50, being able to control operations of respective constituent elements of the computer 50.

The RAM 53 is an occasionally-writable and readable semiconductor memory which may be used as an operation storage region when the MPU 51 executes various types of control programs.

The hard disk device 54 is a storage device to store various types of control programs which are executed by the MPU 51 and various types of data. The MPU 51 reads and executes a predetermined control program which is stored in the hard disk device 54, being able to perform various types of control processing.

The input device 55 is a keyboard device or a mouse device, for example. When the input device 55 is operated by an administrator of the biometric authentication device 10, for example, the input device 55 acquires input of various information, which corresponds to the operation content, from the administrator and transmits acquired input information to the MPU 51.

The display device 56 is a liquid crystal display, for example, and displays various texts and images in accordance with display data which is transmitted from the MPU 51. The interface device 57 administrates transmission and reception of various information among various devices which are connected to the computer 50.

The storage medium driving device 58 reads various types of control programs and data which are stored in a portable storage medium 60. The MPU 51 may perform various types of control processing described later by reading and executing a predetermined control program which is stored in the portable storage medium 60 via the storage medium driving device 58. Examples of the portable storage medium 60 include a compact disc read only memory (CD-ROM), a digital versatile disc read only memory (DVD-ROM), and a flash memory provided with a connector of the universal serial bus (USB) standard.

In order to constitute the biometric authentication device 10 by using such computer 50, a control program to allow the MPU 51 to perform later-described control processing is generated, for example. The generated control program is preliminarily stored in the hard disk device 54 or the portable storage medium 60. In this program, the hard disk device 54 is set to serve as the continuous image storage unit 32 and the correction image storage unit 39, for example. Further, the imaging device 20 of FIG. 5 which is an example of the continuous image photographing unit 31 (that is, the acquisition unit 11) is connected to the interface device 57 of the computer 50 so that the computer 50 may take in biological images by controlling the imaging device 20 to allow the imaging device 20 to acquire the biological images. Then, a predetermined instruction is given to the MPU 51 so as to allow the MPU 51 to read and execute the control program. Thus, the computer 50 may provide the functions of respective functional blocks of the biometric authentication device 10.

Figure 14:
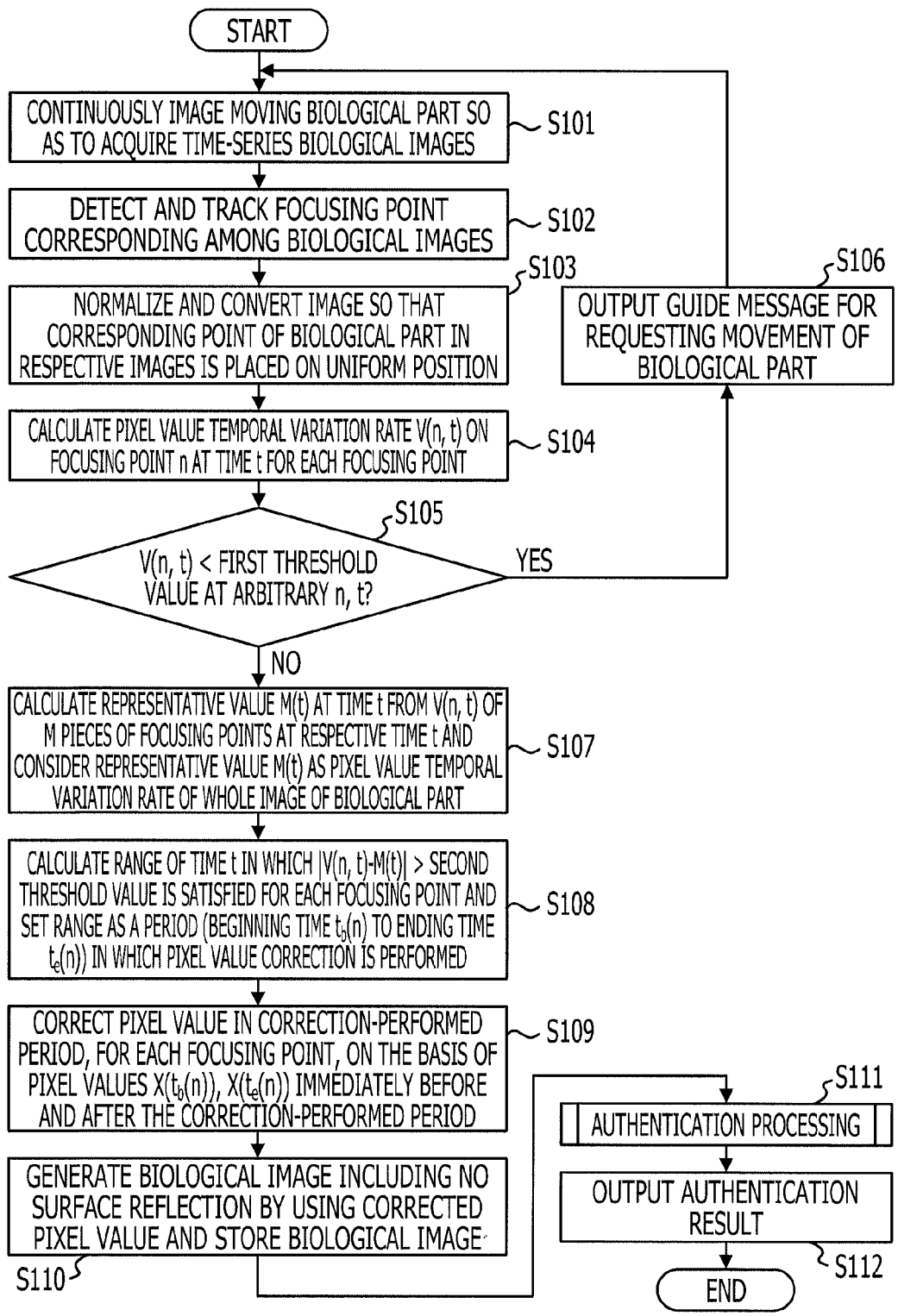
FIG. 14 is a flowchart illustrating processing contents of control processing performed by the biometric authentication device.

Control processing performed by the biometric authentication device 10 is now described. FIG. 14 is a flowchart illustrating processing contents of the control processing. When the control processing is started, the continuous image photographing unit 31 first performs processing in which the continuous image photographing unit 31 continuously photographs a biological part of an authenticated person while changing a relative position with respect to the biological part and acquires time-series biological images so as to store the acquired biological images in the continuous image storage unit 32, in S101. Here, the relative position with respect to the biological part of the authenticated person is changed by moving the biological part of the authenticated person.

Then, the image tracking normalization unit 33 performs processing in which the image tracking normalization unit 33 detects a plurality of focusing points, which correspond among the biological images, on an image of the biological part from the time-series biological images stored in the continuous image storage unit 32 and tracks the focusing points, in S102.

Subsequently, the image tracking normalization unit 33 performs image normalization conversion processing so as to place the corresponding focusing points respectively on the same positions among the biological images, in S103. Then, the pixel value variation rate calculation unit 34 performs processing in which the pixel value variation rate calculation unit 34 calculates a pixel value of each of the focusing points from the time-series biological images and calculates a pixel value temporal variation rate $V(n, t)$ of a focusing point n at photographing time t for each of the focusing points on the basis of the obtained pixel value and photographing time of the biological image, in S104.

Next, the pixel value variation rate calculation unit 34 performs processing of determining whether the pixel value temporal variation rate $V(n, t)$ obtained by the processing of S104 is smaller than a predetermined first threshold value on an arbitrary focusing point n at arbitrary photographing time t, in S105. When the pixel value variation rate calculation unit 34 determines that the pixel value temporal variation rate $V(n, t)$ is smaller than the first threshold value on the arbitrary focusing point n at the arbitrary photographing time t (when a determination result is Yes), the processing goes to S106. On the other hand, when the pixel value variation rate calculation unit 34 determines that there is a combination of n and t at which the pixel value temporal variation rate $V(n, t)$ is equal to or more than the first threshold value (when the determination result is No), the processing goes to S107.

In S106, the guide message output unit 35 performs processing of outputting a message (notification) to guide the authenticated person to move the biological part for re-imaging of biological images. Subsequently, the guide message output unit 35 returns the processing to S101 and then, the above-described processing is executed again.

In S107, the diffuse reflection component variation rate estimation unit 36 performs processing of calculating a representative value M(t) of the pixel value temporal variation rates V(n, t) on predetermined number (M pieces) of focusing points at every photographing time t of the time-series biological images. In the embodiment, a median value or an average value of pixel value temporal variation rates V(n, t) of M pieces of focusing points is employed as the representative value, as described above. The representative value M(t) obtained by this processing is an estimation result of the pixel value temporal variation rate of the whole image of the biological part.

Then, in S108, the correction range calculation unit 37 performs processing of calculating a range of photographing time t in which an absolute value of V(n, t)-M(t) is larger than a predetermined second threshold value on each of detected focusing points. Ranges of photographing time t which are obtained at respective focusing points by this processing become periods in which correction with respect to pixel values of respective focusing points is performed. Here, beginning time of a range of photographing time t in which correction of a pixel value on the focusing point n is performed is denoted as $t_b(n)$ and ending time of the range is denoted as $t_e(n)$.

Subsequently, in S109, the pixel value correction unit 38 performs processing of correcting a pixel value within the period obtained in the processing of S108 for each of the focusing points. In this processing, corrected luminance value $X_{new}(t_a(n))$ on the focusing point n at time $t_a(n)$ within the period obtained in the processing of S108 is calculated by performing calculation of the above-mentioned Formula 1. Here, an estimation result of the pixel value temporal variation rate of the whole image of the biological part which is obtained in the processing of S107 is assigned to M(t) in Formula 1.

Then, in S110, the pixel value correction unit 38 performs processing in which the pixel value correction unit 38 generates a biological image including no surface reflection from the biological part on the basis of the luminance value corrected in the processing of S109 and stores the biological image in the correction image storage unit 39. By this processing, a plurality of biological images including no surface reflection from the biological part is stored in the correction image storage unit 39 in time series.

Here, in the processing of S110, the pixel value correction unit 38 stores not only the biological image including no surface reflection from the biological part but also respective information of photographing time, the number of corrected focusing points, and the variation amount of a pixel value which is changed by the correction, in the correction image storage unit 39 in a manner to associate the information with the biological image.

Subsequently, in S111, the biometric authentication unit 40 performs authentication processing in which personal identification of a certain authenticated person is performed by biometric authentication in which a corrected biological image read from the correction image storage unit 39 is compared and collated with preliminarily-registered biological information of the certain authenticated person. Here, details of this authentication processing will be described later.

Then, in S112, the authentication result output unit 41 performs processing of outputting a result of the personal identification by the authentication processing of S111. Then, the control processing of FIG. 14 is ended. The processing contents of the authentication processing of S111 in the control processing of FIG. 14 are now described.

Figure 15:
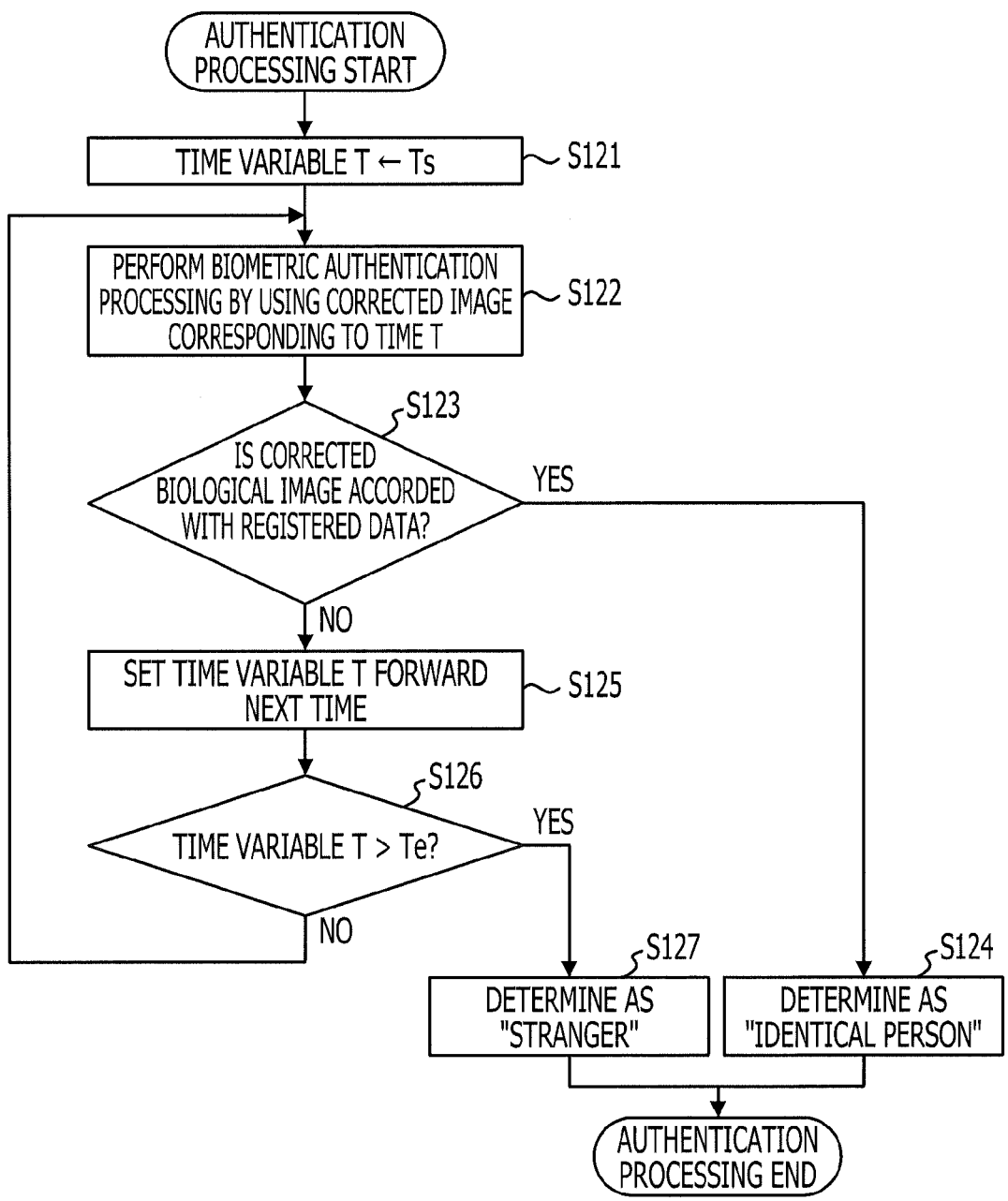
FIG. 15 is a flowchart illustrating processing contents of a first example of authentication processing.

FIG. 15 is first described. FIG. 15 is a flowchart illustrating processing contents of a first example of the authentication processing. In this first example, the biometric authentication unit 40 compares and collates each of a plurality of biological images which are stored in the correction image storage unit 39 and include no surface reflection from a biological part with registered biological information of an authenticated person (above-described registered biological information). Here, when the biometric authentication unit 40 succeeds in authentication between at least one of the plurality of biological images which are stored in the correction image storage unit 39 and the registered biological information, the biometric authentication unit 40 identifies the authenticated person.

When the processing of FIG. 15 is started, the biometric authentication unit 40 first performs processing of assigning an initial value Ts to time variable T for specifying photographing time, in S121. As this initial value Ts, starting time of continuous photographing of a biological part performed by the continuous image photographing unit 31 is set.

Then, in S122, the biometric authentication unit 40 performs biometric authentication processing in which the biometric authentication unit 40 reads out a biological image at photographing time T from the correction image storage unit 39 among the plurality of biological images which are stored in the correction image storage unit 39 and include no surface reflection from the biological part, and compares and collates the read-out biological image with the registered biological information.

Subsequently, in S123, the biometric authentication unit 40 performs processing of determining whether the biological image read out from the correction image storage unit 39 is accorded with the registered biological information (whether the degree of similarity of the read-out biological image and the registered biological information is larger than a predetermined threshold value) as a result of the biometric authentication processing of S122. When the biometric authentication unit 40 determines that the read-out biological image and the registered biological information are accorded with each other (when the determination result is Yes), the biometric authentication unit 40 performs processing of determining that the authenticated person is identified in S124 and then ends the authentication processing. On the other hand, when the biometric authentication unit 40 determines that the read-out biological image and the registered biological information are not accorded with each other (when the determination result is No), the processing goes to S125.

In S125, the biometric authentication unit 40 performs processing in which the biometric authentication unit 40 changes the above-described value of the time variable T so as to set forward from the currently-set photographing time to next photographing time of a biological image. Then, in S126, the biometric authentication unit 40 performs processing of determining whether the value of the time variable T exceeds ending time Te of the continuous photographing of the biological part performed by the continuous image photographing unit 31. When the biometric authentication unit 40 determines that the value of the time variable T exceeds the ending time Te (when the determination result is Yes), the biometric authentication unit 40 performs processing of providing a determination result that the authenticated person is a stranger, in S127 and then ends this authentication processing. On the other hand, when the biometric authentication unit 40 determines that the value of the time variable T does not exceed the ending time Te (when the determination result is No), the biometric authentication unit 40 returns the processing to S122 and then executes the above-described processing again.

Figure 16:
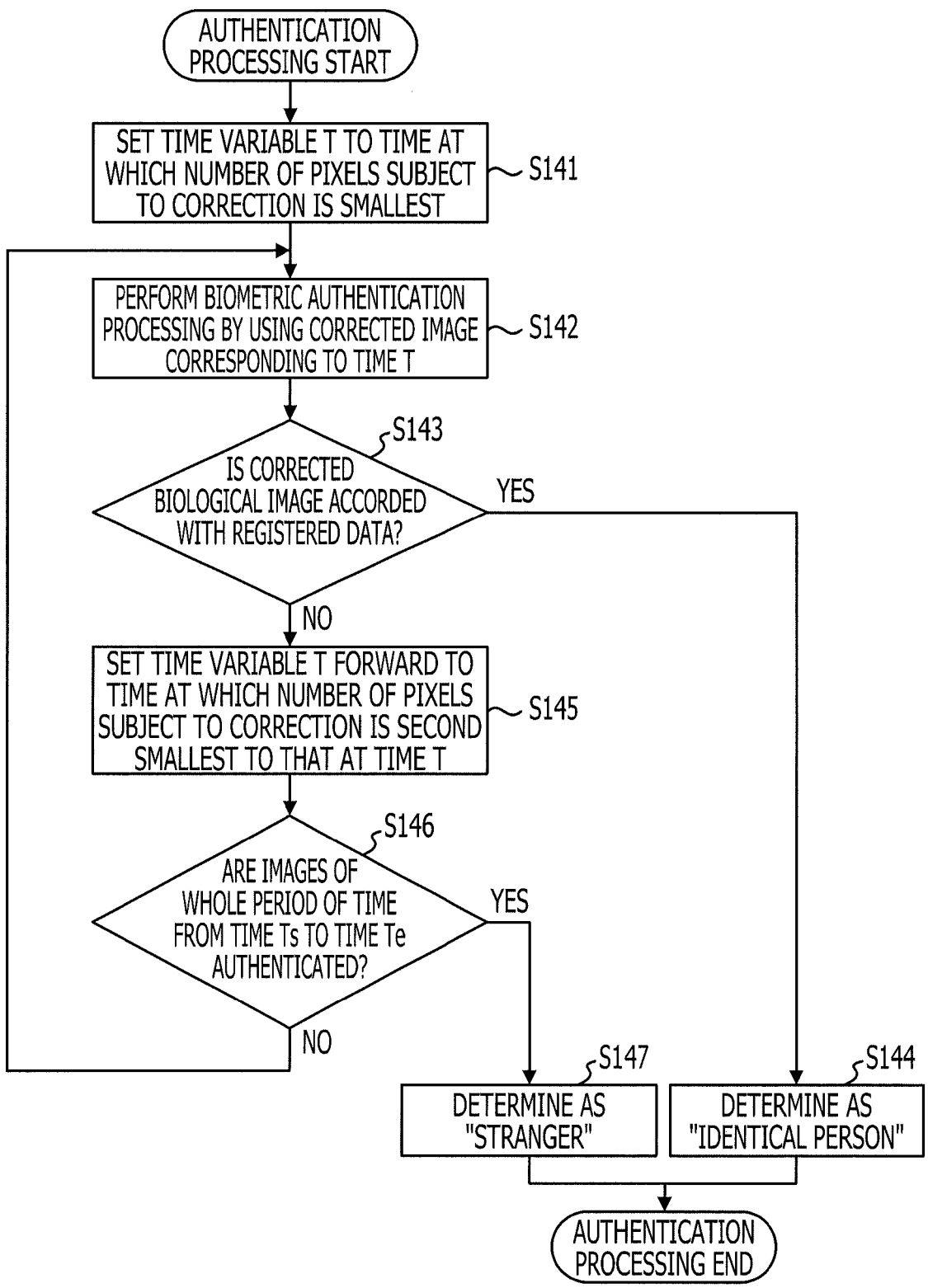
FIG. 16 is a flowchart illustrating processing contents of a second example of the authentication processing.

The processing described thus far is the first example of the authentication processing. FIG. 16 is now described. FIG. 16 is a flowchart illustrating processing contents of a second example of the authentication processing.

In this second example, the biometric authentication unit 40 compares and collates each of a plurality of biological images which are stored in the correction image storage unit 39 and include no surface reflection from a biological part with registered biological information, as is the case with the first example. However, in the second example, the biometric authentication unit 40 compares and collates biological images read out from the correction image storage unit 39 with the registered biological information in an order of images having smaller correction, more specifically, an order of images with smaller number of focusing points at which a pixel value is corrected.

When the processing of FIG. 16 is started, the biometric authentication unit 40 first performs processing of setting an initial value of time variable T for specifying photographing time in S141. In the processing of FIG. 16, photographing time of a biological image having the smallest number of focusing points at which correction is performed is set to be time variable T as the initial value. Here, information of the number of focusing points subject to the correction is stored in the correction image storage unit 39 in a manner to be associated with biological images, by the processing of S110 of FIG. 14 described above. In the processing of S141, the biometric authentication unit 40 refers to this information so as to set the time variable T to photographing time of a biological image having the smallest number of focusing points subject to the correction, as the initial value.

Then, in S142, the biometric authentication unit 40 performs biometric authentication processing in which the biometric authentication unit 40 reads out a biological image at photographing time T from the correction image storage unit 39 among the plurality of biological images which are stored in the correction image storage unit 39 and include no surface reflection from the biological part, and compares and collates the read-out biological image with the registered biological information.

Subsequently, in S143, the biometric authentication unit 40 performs processing of determining whether the biological image read out from the correction image storage unit 39 is accorded with the registered biological information (whether the degree of similarity of the read-out biological image and the registered biological information is larger than a predetermined threshold value) as a result of the biometric authentication processing of S142. When the biometric authentication unit 40 determines that the read-out biological image and the registered biological information are accorded with each other (when the determination result is Yes), the biometric authentication unit 40 performs processing of providing a determination result that the authenticated person is identified, in S144 and then ends the authentication processing. On the other hand, when the biometric authentication unit 40 determines that the read-out biological image and the registered biological information are not accorded with each other (when the determination result is No), the processing goes to S145.

Then, in S145, the biometric authentication unit 40 performs processing in which the biometric authentication unit 40 changes the above-described value of the time variable T so as to set forward to photographing time of a biological image of which the number of focusing points subject to the correction is the second smallest to that of the biological image at the photographing time which is currently set as the time variable T.

Subsequently, in S146, the biometric authenticated unit 40 performs processing of determining whether the biometric authentication processing of S142 is performed by using all biological images of which photographing time is in a period from the starting time Ts of the continuous photographing of the biological part performed by the continuous image photographing unit 31 to the ending time Te of the continuous photographing. Here, when the biometric authentication unit 40 determines that the biometric authentication processing is performed by using the all biological images (when the determination result is Yes), the biometric authentication unit 40 performs processing of providing a determination result that the authenticated person is a stranger, in S147 and then ends the authentication processing. On the other hand, when the biometric authentication unit 40 determines that there still are biological images which have not been used for the biometric authentication processing in the correction image storage unit 39 (when the determination result is No), the biometric authentication unit 40 returns the processing to S142 and then executes the above-described processing again. The processing described thus far is the second example of the authentication processing.

Figure 17:
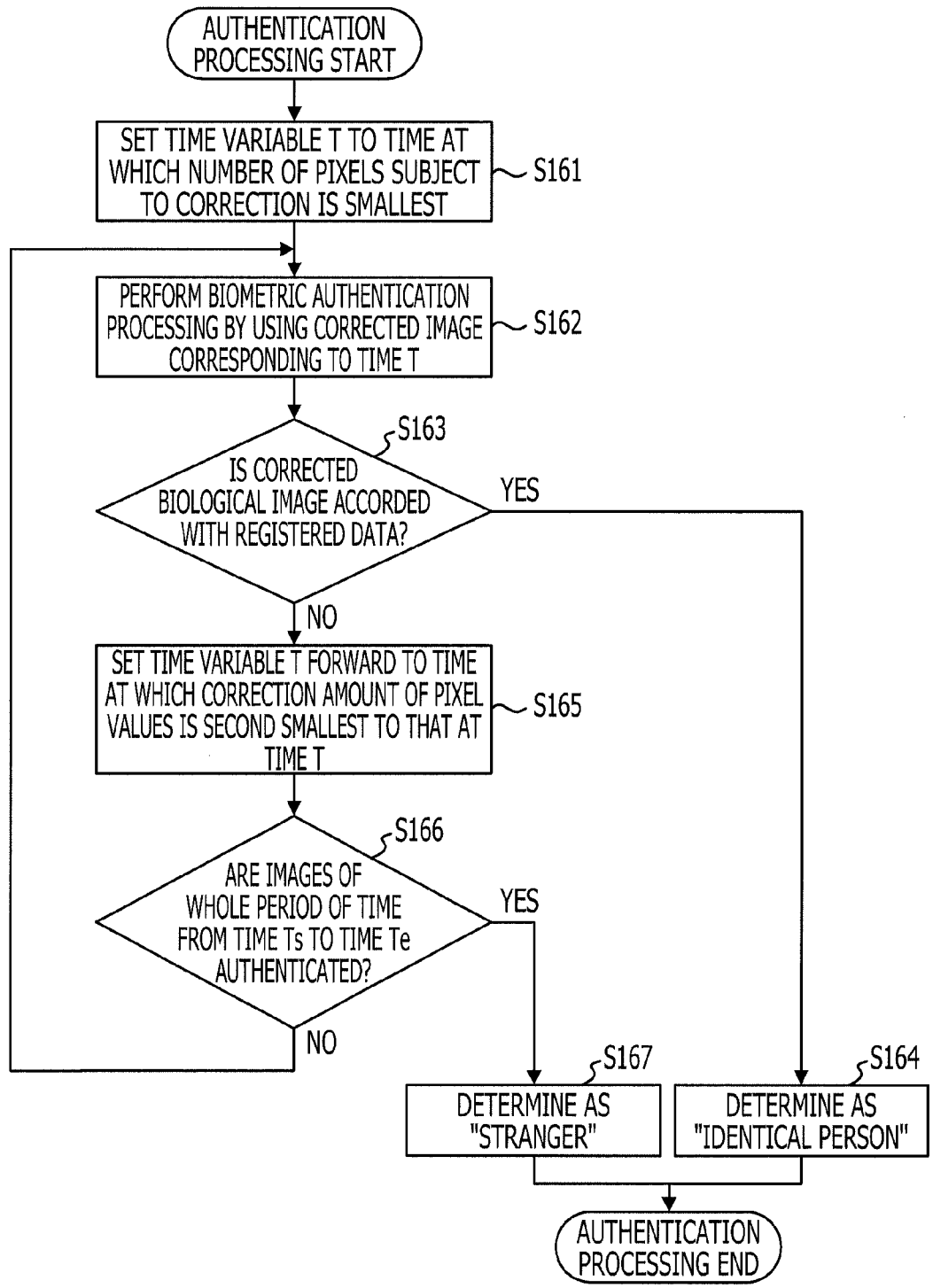
FIG. 17 is a flowchart illustrating processing contents of a third example of the authentication processing.

FIG. 17 is now described. FIG. 17 is a flowchart illustrating processing contents of a third example of the authentication processing. In this third example as well, the biometric authentication unit 40 compares and collates each of a plurality of biological images which are stored in the correction image storage unit 39 and include no surface reflection from a biological part with registered biological information, as is the case with the first example. However, in the third example, the biometric authentication unit 40 compares and collates biological images read out from the correction image storage unit 39 with the registered biological information in an order of images having smaller correction, more specifically, an order of images in which a sum of difference between pixel values of before and after correction in respective focusing points subject to the correction is smaller.

When the processing of FIG. 17 is started, the biometric authentication unit 40 first performs processing of setting an initial value of time variable T for specifying photographing time, in S161. In the processing of FIG. 17, photographing time of a biological image having the smallest correction amount of pixel values is set to be time variable T as the initial value. Here, the correction amount of pixel values of a biological image is obtained by calculating a sum of absolute values of difference between values before and after the correction of pixel values subject to the correction, on all focusing points, at which the correction is performed, of the biological image subject.

Here, information of the changing amount of pixel values which are changed by the correction (that is, difference between values before and after the correction) on respective focusing points is stored in the correction image storage unit 39 by the processing of S110 of FIG. 14 described above, in a manner to be associated with the biological images. In the processing of S161, the biometric authentication unit 40 calculates correction amounts of the pixel values of respective biological images by using this information so as to set the time variable T to photographing time of a biological image of which the correction amount of pixel values is the smallest, as the initial value.

Then, in S162, the biometric authentication unit 40 performs biometric authentication processing in which the biometric authentication unit 40 reads out a biological image at the photographing time T from the correction image storage unit 39 among the plurality of biological images which are stored in the correction image storage unit 39 and include no surface reflection from the biological part, and compares and collates the read-out biological image with the registered biological information.

Subsequently, in S163, the biometric authentication unit 40 performs processing of determining whether the biological image read out from the correction image storage unit 39 is accorded with the registered biological information (whether the degree of similarity between the read-out biological image and the registered biological information is larger than a predetermined threshold value) as a result of the biometric authentication processing of S162. When the biometric authentication unit 40 determines that the read-out biological image and the registered biological information are accorded with each other (when the determination result is Yes), the biometric authentication unit 40 performs processing of providing a determination result that the authenticated person is identified, in S164 and then ends the authentication processing. On the other hand, when the biometric authentication unit 40 determines that the read-out biological image and the registered biological information are not accorded with each other (when the determination result is No), the processing goes to S165.

Then, in S165, the biometric authentication unit 40 performs processing in which the biometric authentication unit 40 changes the above-described value of the time variable T so as to set forward to photographing time of a biological image of which the correction amount of pixel values is the second smallest to that of a biological image at photographing time which is currently set as the time variable T.

Subsequently, in S166, the biometric authenticated unit 40 performs processing of determining whether the biometric authentication processing of S162 is performed by using all biological images of which photographing time is in a period from the starting time Ts of the continuous photographing of the biological part performed by the continuous image photographing unit 31 to the ending time Te of the continuous photographing. Here, when the biometric authentication unit 40 determines that the biometric authentication processing is performed by using the all biological images (when the determination result is Yes), the biometric authentication unit 40 performs processing of providing a determination result that the authenticated person is a stranger, in S167 and then ends the authentication processing. On the other hand, when the biometric authentication unit 40 determines that there still are biological images which have not been used for the biometric authentication processing in the correction image storage unit 39 (when the determination result is No), the biometric authentication unit 40 returns the processing to S162 and then executes the above-described processing again.

The processing described thus far is the third example of the authentication processing. By executing the above-described processing illustrated in FIGS. 14 to 17, the biometric authentication device 10 may perform biometric authentication while removing an effect caused by surface reflection components included in reflection light at a biological part.

Here, the intensity of diffuse reflection components included in pixel values depends on a distance between the imaging device 20 and a photographing object. Therefore, the biometric authentication device 10 may estimate a pixel value temporal variation rate of the whole image of a biological part by using a distance sensor which detects the distance between the imaging device 20 and a photographing object.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A biometric authentication device comprising:
a processor; and
a memory which stores a plurality of instructions, which when executed by the processor, cause the processor to execute:
acquiring time-series biological images by repeatedly imaging a biological part of an authenticated person while changing a relative position with respect to the biological part;
detecting a pixel value corresponding to a same position among the time-series biological images;
extracting a pixel of which the pixel value includes a surface reflection component from the biological part, from each of the time-series biological images, based on a degree of divergence of temporal variation of the pixel value of the detected pixel in the time-series biological images from an estimation result of temporal variation of a pixel value in all pixels that constitute the time-series biological images;
generating a biological image including no surface reflection from the biological part by correcting the pixel value of the extracted pixel based on a pixel value of a pixel corresponding to the extracted pixel in each of the time-series biological images other than an extraction origin of the extracted pixel; and
performing personal authentication of the authenticated person by using the biological image that is generated.

2. The device according to claim 1, wherein the extracting uses temporal variation of a median of pixel values of a plurality of pixels that are extracted from the time-series biological images, as an estimation result of temporal variation of the pixel value of all pixels that constitute the time-series biological images.

3. The device according to claim 1, wherein the extracting uses temporal variation of an average value of pixel values of a plurality of pixels that are extracted from the time-series biological images, as an estimation result of temporal variation of the pixel value of all pixels that constitute the time-series biological images.

4. The device according to claim 1, wherein the generating corrects the pixel value of the extracted pixel by interpolating the pixel value of the extracted pixel at photographing time of the biological image which is the extraction origin of the extracted pixel, on the basis of a corresponding relationship between photographing time and a pixel value of a pixel corresponding to the extracted pixel, in each of the time-series biological images other than the extraction origin of the extracted pixel.

5. The device according to claim 1, wherein the plurality of instructions, which when executed by the processor, cause the processor to further execute:
notifying the authenticated person of an execution of re-imaging of the biological image in a case where the degree of divergence of temporal variation of the pixel value of the pixel in the time-series biological images from the estimation result of temporal variation of the pixel value of all pixels that constitute the time-series biological images is lower than a predetermined threshold value in all pixels.

6. The device according to claim 1,
wherein the generating generates a plurality of biological images including no surface reflection from the biological part, from the time-series biological images, and
wherein the performing performs authentication between each of the plurality of biological images that are generated and a registered biological image, the registered biological image being preliminarily registered, of the authenticated person, and identifies the authenticated person as an identical person in a case where the authentication unit succeeds in authentication with respect to at least one of the plurality of biological images that are generated.

7. The device according to claim 6, wherein the performing performs the personal authentication by using the plurality of biological images that are generated, in an order of biological images having lower number of pixels subject to the correction.

8. The device according to claim 6, wherein the plurality of instructions, which when executed by the processor, cause the processor to further execute determining a sum of absolute value of difference between pixel values of respective pixels subject to the correcting, and
wherein the performing performs the personal authentication by using the plurality of biological images that are generated, in an order of biological images having a lower sum of absolute values of difference.

9. The device according to claim 1, wherein
the detecting detects a plurality of pixel values each having a same position among the time-series biological images, and
the generating of the biological image is based on correcting the plurality of pixel values corresponding to pixels extracted in time-series biological images.

10. A biometric authentication method, comprising:
acquiring time-series biological images by repeatedly imaging a biological part of an authenticated person while changing a relative position with respect to the biological part;
detecting a pixel value corresponding to a same position among the biological images from the time-series biological images;
extracting a pixel of which the pixel value includes a surface reflection component from the biological part, from each of the time-series biological images, based on a degree of divergence of temporal variation of the pixel value of the detected pixel in the time-series biological images from an estimation result of temporal variation of a pixel value in all pixels that constitute the time-series biological images;
generating, by a computer processor, a biological image including no surface reflection from the biological part by correcting the pixel value of the extracted pixel based on a pixel value of a pixel corresponding to the extracted pixel in each of the time-series biological images other than an extraction origin of the extracted pixel; and
performing personal authentication of the authenticated person by using the biological image that is generated.

11. The method according to claim 10, wherein, in the extracting, temporal variation of a median of pixel values of a plurality of pixels that are extracted from the time-series biological images is used as an estimation result of temporal variation of the pixel value of all pixels that constitute the time-series biological images.

12. The method according to claim 10, wherein, in the extracting, temporal variation of an average value of pixel values of a plurality of pixels that are extracted from the time-series biological images is used as an estimation result of temporal variation of the pixel value of all pixels that constitute the time-series biological images.

13. The method according to claim 10, wherein, in the generating, the pixel value of the extracted pixel at photographing time of the biological image which is the extraction origin of the extracted pixel is interpolated, on the basis of a corresponding relationship between photographing time and a pixel value of a pixel corresponding to the extracted pixel, in each of the time-series biological images other than the extraction origin of the extracted pixel, to thereby correct the pixel value of the extracted pixel.

14. The method according to claim 10, further comprising:
notifying the authenticated person of an execution of re-imaging of the biological image in a case where the degree of divergence of temporal variation of the pixel value of the pixel in the time-series biological images from the estimation result of temporal variation of the pixel value of all pixels that constitute the time-series biological images is lower than a predetermined threshold value in all pixels.

15. The method according to claim 10,
wherein in the generation, a plurality of biological images including no surface reflection from the biological part is generated from the time-series biological images, and
wherein, in the performing personal authentication, authentication between each of the plurality of biological images that are generated and a registered biological image, the registered biological image being preliminarily registered, of the authenticated person is performed, and the authenticated person is identified as an identical person in a case where authentication with respect to at least one of the plurality of biological images that are generated is successful.

16. The method according to claim 15, wherein, in the performing personal authentication, the personal authentication is performed by using the plurality of biological images that are generated, in an order of biological images having lower number of pixels subject to the correction.

17. The method according to claim 15, further comprising determining a sum of absolute value of difference between pixel values of respective pixels subject to the correcting, and
wherein, in the performing personal authentication, the personal authentication is performed by using the plurality of biological images that are generated, in an order of biological images having a lower sum of absolute values of difference.

18. A non-transitory computer-readable storage medium storing a biometric authentication program that causes a computer to execute a process comprising:
acquiring time-series biological images by repeatedly imaging a biological part of an authenticated person while changing a relative position with respect to the biological part;

detecting a pixel value corresponding to a same position among the biological images from the time-series biological images;

extracting a pixel of which the pixel value includes a surface reflection component from the biological part, from each of the time-series biological images, based on a degree of divergence of temporal variation of the pixel value of the detected pixel in the time-series biological images from an estimation result of temporal variation of a pixel value in all pixels that constitute the time-series biological images;

generating, by a computer processor, a biological image including no surface reflection from the biological part by correcting the pixel value of the extracted pixel based on the basis of a pixel value of a pixel corresponding to the extracted pixel in each of the time-series biological images other than an extraction origin of the extracted pixel; and performing personal authentication of the authenticated person by using the biological image that is generated.

* * * * *